Sept. 21, 1971   J. E. V. AUCHERE ET AL   3,606,767
WEDDING RING WITH DEFORMABLE MEANS FOR
REDUCING OR INCREASING SIZE
Filed Dec. 22, 1969

United States Patent Office 3,606,767
Patented Sept. 21, 1971

---

3,606,767
WEDDING RING WITH DEFORMABLE MEANS FOR REDUCING OR INCREASING SIZE
Jean Edouard Victor Auchere, 11 Rue du Val, Provins, Seine-et-Marne, France, and Bernard Claude Henri Auchere, 2 Rue du General Delestraint, Rosny-sous-Bois, Seine Saint Denis, France
Filed Dec. 22, 1969, Ser. No. 887,123
Int. Cl. *A44c 9/02*
U.S. Cl. 63—15.5                    2 Claims

ABSTRACT OF THE DISCLOSURE

Wedding-ring set with brilliants and having an annular deformable portion at its inner periphery which can be reduced or increased in inner diameter with the help of a machine for enlarging rings.

---

The wedding-ring comprises inside edges which can be flattened out to increase its internal diameter or its edges can be turned up to decrease this diameter.

The wedding-ring can thus have a varying diameter, covering a certain number of sizes without it being necessary to modify the brilliants which are set in it.

This invention relates to a wedding-ring set with brilliants and which can be enlarged.

The aim of the invention is to create a wedding-ring set with brilliants and which can be enlarged with usual methods, i.e. with a machine for enlarging rings.

The invention also aims at creating a wedding-ring which can be enlarged by several sizes without welding, and without interfering with the brilliants which are set in it.

Various methods of producing the wedding-rings set with brilliants in accordance with the invention are described hereafter with reference being made to the drawings in which.

Figure 1:
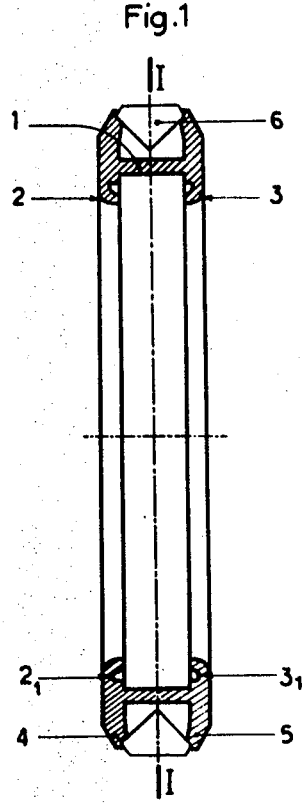
FIG. 1 is an axial section view of a wedding-ring in accordance with the invention.
Figure 2:
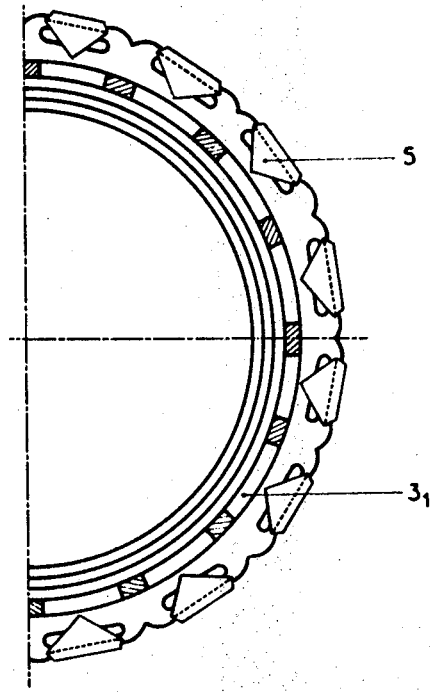
FIG. 2 is a partial diametrical section view of a wedding-ring in accordance with the invention.

In accordance with FIGS. 1 and 2, the wedding-ring forming the object of the invention comprises a body 1 having an H-shaped profile with inside edges 2, 3 and outside edges 4, 5 for the fixing of brilliants 6.

The inside edges 2 and 3 each comprise a peripheral groove 21 and 31 directed towards the plane of symmetry II. These peripheral grooves 21 and 31 can be flattened out or turned inwards to obtain respectively an increase or a reduction of the internal diameter of the ring so that it will adapt to various fingers.

The body of the wedding-ring is preferably made of grey gold with palladium, this puroduct being well known for its malleability.

FIG. 2 shows in more detail the brilliants 5 set in the upper edges of the ring as well as the peripheral groove 31 which permits modification of the internal diameter in contact with the finger. The inside edges or the peripheral grooves 21 and 31 are flattened out with the aid of a machine for enlarging rings, i.e. a machine which is already known. In order to reduce the inside diameter of the wedding-ring, the inside edges are deformed so as to enlarge the peripheral grooves 21 and 31 with the aid of a curved implement.

Figure 3:
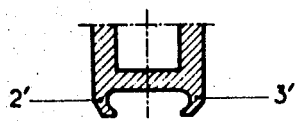
FIGS. 3, 4 and 5 represent various sections of the open inside edges of a wedding-ring in accordance with the invention.
Figure 4:
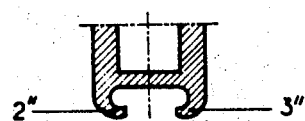
Figure 5:
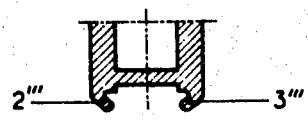

FIGS. 3, 4 and 5 represent various types of profile, of inner edges 2′, 3′, 2″, 3″, 2‴, 3‴. These edges each have their particular characteristics and their shape depends on the general shape of the wedding-ring.

Figure 6:
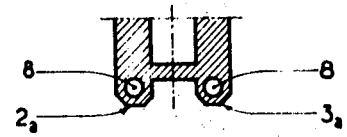
FIGS. 6 to 8 represent various methods of producing the closed inside edges of a wedding-ring in accordance with the invention.
Figure 7:
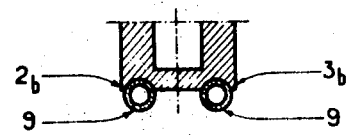
Figure 8:
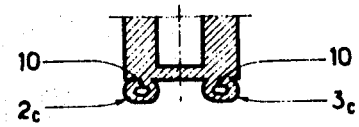

FIGS. 6 to 8 represent other production variations of the invention, in accordance with which the inside edges as at 2a, 3a, join in a hollow tube 8 which can be flattened out in order to reduce the diameter of the wedding-ring. However, this production method does not allow the inside diameter of the wedding-ring to be increased.

FIG. 7 shows inside edges 2b, 3b with inlaid tubes 9.

FIG. 8 is a variation of the production method represented in FIG. 6 with another shape of inside edges 2c, 3c with tubes 10.

As the enlargement of the wedding-ring is effected by the use of an already-known enlarging machine, two operations are necessary to flatten out the two inside edges to the same extent: firstly one of the edges is flattened out; then the other edge is turned back and flattened out.

It should be understood that the invention is not limited to the production examples described and represented above; from these it is possible to foresee other variations which in no way exceed the compass of the invention.

What is claimed is:

1. A wedding-ring adapted to be set with brilliants and which can be enlarged, made from a cylindrical body having an H-shaped radial cross-section, the crossbar of the H being the radially intermediate part of said cross-section, the two outer edges of said cross-section being adapted to hold brilliants and the two inside edges in contact with the finger each having a peripheral groove with its open side directed towards the plane of symmetry of the ring, said grooves each having a radially inner wall which can be deformed by flattening out towards the outside to increase the inner diameter or by bending back and flattening towards the interior to reduce the inner diameter.

2. A wedding-ring set with brilliants and which can be enlarged as defined in claim 1, which is made of material comprising grey gold.

References Cited

UNITED STATES PATENTS

| | | | |
|---|---|---|---|
| 2,055,315 | 9/1936 | Sessa | 63—15X |
| 3,071,940 | 1/1963 | Schneider | 63—15 |
| 3,077,750 | 2/1963 | Gibeault | 63—15.5 |

FOREIGN PATENTS

| | | | |
|---|---|---|---|
| 1,408,730 | 7/1965 | France | 63—15.5 |
| 24,256 | 7/1914 | Great Britain | 63—15 |
| 330,763 | 6/1930 | Great Britain | 63—15 |

F. BARRY SHAY, Primary Examiner

U.S. Cl. X.R.

29—401